United States Patent [19]

Ungar et al.

[11] Patent Number: 4,724,187
[45] Date of Patent: Feb. 9, 1988

[54] CONDUCTIVE LAMINATE FLOORING

[75] Inventors: Israel S. Ungar, Randallstown; Robin D. O'Dell, Pasadena; Alice M. Simon, Glen Burnie, all of Md.

[73] Assignee: Nevamar Corporation, Odenton, Md.

[21] Appl. No.: 843,648

[22] Filed: Mar. 25, 1986

[51] Int. Cl.[4] .......................... B32B 9/00; B32B 27/08
[52] U.S. Cl. .................................... 428/408; 428/511; 428/525; 428/530; 428/696; 428/922; 428/537.7; 156/222
[58] Field of Search ............... 428/408, 525, 530, 696, 428/922, 511, 537.7

[56] References Cited

U.S. PATENT DOCUMENTS 4,454,199  6/1984  Berbeco ............................. 428/511
4,472,474  9/1984  Grosheim et al. .................. 428/530
4,480,001 10/1984  Cannady, Jr. et al. ............. 428/511

FOREIGN PATENT DOCUMENTS 3323461  8/1984  Fed. Rep. of Germany ...... 428/922

Primary Examiner—P. C. Ives
Attorney, Agent, or Firm—Browdy and Neimark

[57] ABSTRACT

A decorative, high pressure, conductive laminate for flooring material is formed of a plurality of phenolic impregnated carbon-containing core sheets, a melamine resin impregnated decor sheet containing about 3-5% carbon fibers having a length greater than 1/16 inch and preferably ⅛ inch or more, and a melamine resin impregnated abrasion resistant overlay. The overlay melamine resin also contains an ionic salt and a tertiary aliphatic amine, both also preferably being in the decor melamine as well. The laminate has a volume resistance of $2.5 \times 10^4$ to about $10^6$ ohms. To make the product more dimensionally stable, carbon containing core sheets are interleaved with non-carbon-containing kraft sheets, the phenolic resin of which also contains ionic salt.

18 Claims, 1 Drawing Figure

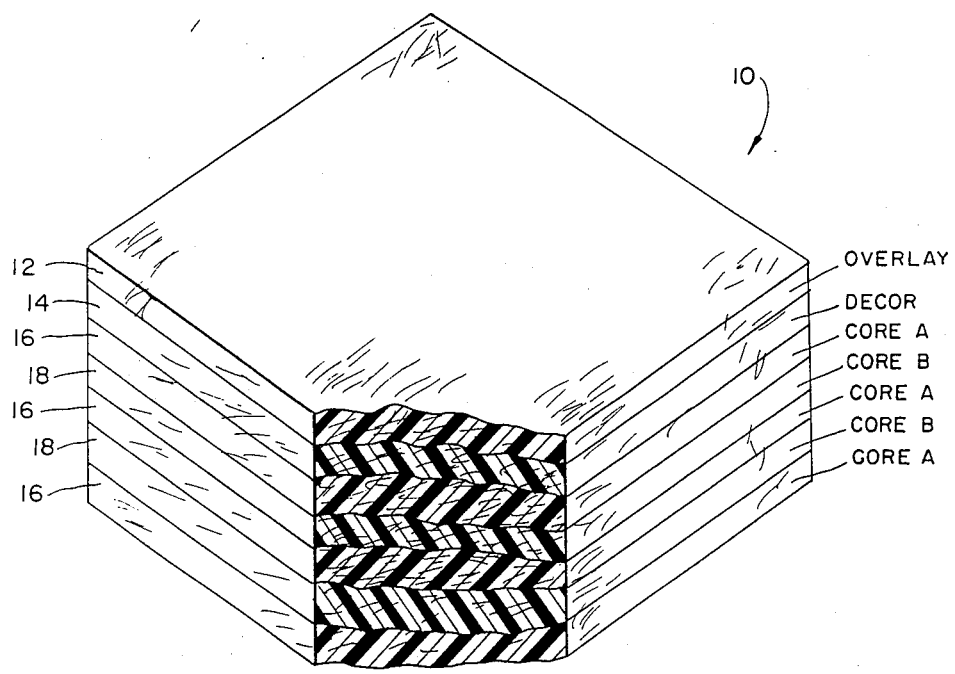

CONDUCTIVE LAMINATE FLOORING

FIELD OF THE INVENTION

The present invention relates to conductive laminate flooring. More particularly, the invention relates to flooring tile formed of abrasion-resistant high-pressure decorative laminate which rapidly dissipates static electricity.

BACKGROUND OF THE INVENTION

Losses of electronic components attributable to electrostatic discharge amounts to tens of millions of dollars each year. Typically a tray or tote bin of electronic components such as integrated circuit chips, in being moved around, picks up a charge of thousands of volts which can reach 30,000 volts when the air is dry. These charges are generated by two surface rubbing or sliding in contact with each other.

When a so charged component is touched or put down, the charge is suddenly discharged, destroying or damaging the component. For this reason, electronic components are packageo in conductive containers. Workers wear special conductive clothing and shoes. Employees are grounded via wrist bands and floor mats. Air is conditioned and ionized. An important factor in controlling static electric discharge (ESD) in clean rooms is the conductivity of the floor covering. A desirable range for resistance to ground is above $2.5 \times 10^4$ ohms up to a maximum of about $10^6$ ohms or at most $10^7$ ohms volume resistance. For this reason, a metal floor is not su:table as it is too conductive.

In order to reduce resistance of typical flooring materials, several different systems have been proposed These include coating a floor with a conductive floor wax, and inclusion of conductive particles in the floor surface However, conductive wax scuffs, collects dirt, flakes off and needs to be replaced per:odically. Conductive vinyl or laminate typically contains carbon particles in the surface; in normal usage, the laminate surface wears and consequently carbon particles wear off or dust from the surface and the resultant carbon dust is dispersed :nto the atmosphere. This conductive dust is not desirable as it may cause short circuits when particles fall onto and into electrical components.

Considerable interest has been expressed in recent years for static dissipative and electrically conductive laminates for use in various env:ronments, including static dissipative work surfaces and conductive flooring. Among the recent patents there may be mentioned the U.S. Pat. No. 3,922,383 to Wilks et al; U.S. Pat. No. 4,472,474 to Grosheim et al; U.S. Pat. Nos. 4,480,001 and 4,540,624 to Cannady et al; U.S. Pat. Nos. 4,454,199 and 4,455,350 to Berbeco. The use of carbon filled laminate paper is known, as is the use of salts, the latter having been previously known noting patents such as Meiser U.S. Pat. No. 3,650,821 and Economy et al U.S. Pat. No. 3,567,689. No one product is suitable for all static dissipative and conductive environments, because different usages, i.e. environments, require different properties.

The Department of Defense defines the following relationship between static electrical properties and surface resistivity (in ohms/square):
Anti-static: greater than $10^9$;
Static dissipative: between $10^6$ and $10^9$;
Conductive: less than $10^6$. Surface resistivity of standard high pressure decorative laminate is about $10^{11}$ to $10^{13}$ ohms per square.

SUMMARY OF THE INVENTION

It is, accordingly, an object of the invention to overcome deficiencies in the prior art, such as indicated above.

It is another object to provide for the safe and effective dissipation of static electricity through the floor, particularly in work rooms for the assembly of electronic components.

It is a further objective of the present invention to provide a conductive laminate flooring having a volume resistance greater than $2.5 \times 10^4$ ohms up to a preferable maximum of about $10^6$ or at most $10^7$ ohms.

It is yet another object of the present invention to provide an effective conductive laminate flooring having improved dimensional stability.

It is yet a further object of the present invention to provide an attractive conductive laminate floor mater:al which looks like normal decorative high pressure laminate and has good heat resistance, water resistance, abrasion resistance and stain resistance.

These and other objects and advantages of the instant invention will be more apparent from the following detailed description of certain exemplified embodiments, taking in conjunction with the accompanying drawing wherein:

BRIEF DESCRIPTION OF DRAWING

The sole figure is a schematic perspective view, partly in section, of a laminate in accordance with the present invention.

DETAILED DESCRIPTION OF PREFERRED EMBODIMENTS

A high pressure decorative laminate 10 according to the present invention, for conductive flooring material including floor tile, comprises an overlay 12 as its upper surface, a decor layer 14 therebeneath, and a plurality of core layers 16 and 18. In accordance with conventional practice, the overlay 12 and decor 14 are preferably impregnated with melamine-formaldehyde resin and the core layers 16 and 18 are impregnated with phenol-formaldehyde resin, the impregnated layers are dried and partially cured, and then are stacked and consolidated under heat and pressure to cure the thermosetting resins and produce the final laminate product.

In accordance with the present invention, the overlay 12 is a special abrasion resistant paper impregnated with alumina and manufactured as described in the Lane et al U.S. Pat. No. 3,798,111, and obtained from Mead Corporation. This paper is saturated with melamine resin which has been modified by incorporating therein an ionic salt and a tertiary aliphatic amine, the later of which is believed to act as a humectant.

The decor layer 14 comprises a special paper which is colored or printed to provide a color or pattern, or both, and is impregnated with either unmodified melamine resin or melamine resin containing an ionic salt and a tertiary aliphatic amine such as used in conjunction with the laminating resin for the overlay sheet 12. The paper of the decor sheet contains an amount sufficient of carbon fiber to provide a conductive path therethrough, the quantity being somewhat dependent on the length of the carbon fibers. In general, there should be present at !east 3% by weight, based on the unimpregnated paper sheet, of carbon fibers at lest ⅛ inch long, although some or all of the carbon fibers may be longer, preferably no more than about ½ inch in length. In actual practice, the carbon fibers, being somewhat brittle, break up during the manufacture of the paper and thus if the starting carbon fibers are ½ inch, some fibers in the product will be as long as ½ inch in length, while other fibers will be smaller. In general, the maximum quantity of carbon fibers should not exceed about 5% by weight, as greater quantities increase the cost without any benefit, can cause greying of the decor sheet which may provide an undesirable visual effect, and can even increase the conductivity to an excessive level.

While not essential, it has been found that improved dimensional stability is obtained according to the present invention by the use of two different types of core paper 16 and 18, without diminishing the desired electrical properties. Thus, core sheets 16 are formed of core paper A filled with carbon pigment, and core sheets 18 are formed of conventional kraft core paper B. Both types of core paper are impregnated with phenolic resin and alternated as shown. Carbon paper has relatively poor dimensional stability because some of the paper fiber is replaced with carbon pigment. The use of alternate layers of kraft paper improves the dimensional stability without adversely affecting the electrical properties, and at the same time reduces costs by eliminating the more expensive conductive carbon filled paper.

The phenolic laminating resin used to impregnate the core layers 16 and 18 is modified with ionic salt to improve its conductivity. The ionic salt modified phenolic resin may be used to impregnate both the core paper A and the core paper B, or just the core paper B, i.e. the kraft paper. In general, the quantity of ionic salt used should be relatively low, i.e. no more than about 6% by weight based on the resin solids, preferably 1-5%. Any of a wide variety of ionic salts can be used, including sodium acetate, sodium chloride, sodium formate, magnesium chloride and calcium chloride, among others. Sulphates are less desirable because they are undesirably heavy. In general, lithium chloride is a preferred ionic salt for the core as it gives better results than other salts because it gives the maximum number of ions on a per weight basis. At 2% lithium chloride concentration based on the resin solids, this converts to an amount of less than 0.5% based on the total we:ght of each core sheet, a lesser quantity than has been suggested according to the prior art.

As noted above, the overlay also is impregnated with thermosetting resin, preferably melamine-formaldehyde resin, to which has been added an ionic salt. Again, as with the core, the ionic salt should be present in an amount of no more than about 6% by weight based on the resin solids. Also again, a wide variety of ionic salts will work well, including sodium acetate, sodium chloride, magnesium chloride and calcium chloride, sodium formate among others, and sulphates are less desirable because they are undesirably heavy. In addition, fluorides and bromides are less desirable because these are toxic and some present color problems. While lithium chloride is an advantageous ionic salt for the reasons given above, it does have one disadvantage when used in the overlay; thus, halide salts tend to be corrosive and can cause damage to metal pressing plate dies during manufacture of the laminate. Therefore, sodium acetate or sodium formate is the preferred ionic salt for use in the overlay 12.

As noted above, use of an aliphatic tertiary amine or equivalent, believed to act as a humectant, is essential according to the present invention. The tertiary amine may be present in the overlay 12 in amounts of up to about 6% by weight based on the resin solids, preferably 1-4% by weight. Preferred tertiary amines are ethoxylated aliphatic amines sold under the trademark ETHOMEEN by Akzo Chemie America, and disclosed in the manufacturer's Product Data Bulletin 80-8 (copyright 1980). These ethoxylated tertiary amines have one fatty alkyl group and two hydroxy ethyl or polyoxylene groups attached to the nitrogen atom, the alkyl group preferably containing 12-18 carbons and each molecule containing 2-50 oxyethylene groups. These compounds have the following formula:

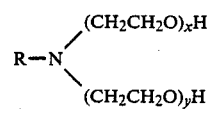

where R is $C_{12}$ to $C_{18}$ and X plus Y equals 2-50.

A number of the ETHOMEEN products were evaluated including ETHOMEEN C/25, ETHOMEEN S/12, ETHOMEEN T/12 and ETHOMEEN T/25. ETHOMEEN C/25 is polyoxyethylene 15 cocoamine (CTFA adopted name: PEG-15 cocoamine), ETHOMEEN S/12 is bis (2-hydroxyethyl) soyaamine (CTFA adopted name: PEG-2 soyaamine), ETHOMEEN T/12 is bis (2-hydroxyethyl) tallowamine (CTFA adopted name: PEG-2 tallow amine), and ETHOMEEN T/25 is polyoxyethylene (15) tallowamine (CTFA adopted name: PEG-25 tallow amine). Of the compounds evaluated, ETHOMEEN T/25 was chosen because of its good solubility in melamine resin. ETHOMEEN T/25 has a Gardner color maximum of 8, a combining weight of 890-950, a maximum moisture content of 1%, is a clear liquid to paste at 2° C., has a specific gravity at 25° C. of 1.028, a typical molecular weight of 922, a flash point of greater than 500° F. (Cleveland Open Cup method), contains 15 moles of ethylene oxide and has an HLB value (cationic) of 19.3.

The present invention provides a number of advantages, including those pointed out above. Yery importantly, the present conductive laminate provides a volume resistance value greater than $2.5 \times 10^4$ ohms up to a preferable maximum of about $10^6$ or at most $10^7$ ohms. It also retains its surface resistance value even at very low relative humidities.

Another advantage of the invention is that it provides an effective conductive laminate flooring having improved dimensional stability. In addition, the product is attractive in that it looks like normal decorative high pressure laminate and has good heat resistance, water resistance, abrasion resistance and stain resistance.

The following examples will illustrate the manner in which the invention can be practiced. It is to be understood that these examples are not to be considered limiting of the invention, but are offered illustratively.

EXAMPLE 1

A series of laminates were made using conductive black carbon-containing kraft core paper saturated with pnenolic res:n modified by the addition of 4% lithium chloride. The resin content was 33-37%, volatile content 6-8%, and flow 1-3%. The laminates were made using decor paper containing carbon fibers, obtained from Stackpol Fibers Company, Inc. of Lowell, Massachusetts, the carbon fibers being of various lengths. The decor paper was saturated with melamine resin at 52-56% resin content and 4.5-6.5% volatile content. Some laminates were made with overlay and some without; when used, the overlay was a Mead high wear Alpha paper of 30 pounds per ream saturated with 64-68% resin at 4-5% volatile content and 10-20% flow, the melamine resin being modified with 4% sodium acetate and 5% ETHOMEEN T/25. The results, showing variations based on carbon fiber length and quantity, and on presence or absence of overlay, are shown in Table 1 below:

TABLE 1

|  | 3% | | 4% | |
|---|---|---|---|---|
|  | O/L | No O/L | O/L | No O/L |
| ⅛" Fiber | | | | |
| Surface Resistance (ohms) | $2 \times 10^6$ | $5 \times 10^3$ | — | — |
| Volume Resistance (ohms) | $1 \times 10^6$ | $3 \times 10^4$ | — | — |
| ¼" Fiber | | | | |
| Surface (ohms) | $4 \times 10^6$ | $5 \times 10^3$ | $4 \times 10^6$ | $3 \times 10^3$ |
| Volume (ohms) | $4.5 \times 10^6$ | $2 \times 10^3$ | $3 \times 10^6$ | $5 \times 10^3$ |
| ⅛" Fiber | | | | |
| Surface (ohms) | $5 \times 10^6$ | $5 \times 10^3$ | $5 \times 10^6$ | $4 \times 10^3$ |
| Volume (ohms) | $4.5 \times 10^6$ | $8 \times 10^3$ | $5 \times 10^5$ | $1 \times 10^3$ |
| 1/16" Fiber | | | | |
| Surface (ohms) | $1 \times 10^7$ | $1 \times 10^8$ | $4 \times 10^7$ | $6 \times 10^6$ |
| Volume (ohms) | $1 \times 10^7$ | $9 \times 10^7$ | $3 \times 10^7$ | $2 \times 10^6$ |

In general, it can be seen that there is at least 0.5 order of magnitude jump in resistance between the use of 1/16 inch carbon fibers and ⅛ inch carbon fibers; in three of the four comparisons, the jump was considerably greater than an order of magnitude. On the other hand, while the use of 4% carbon fibers gives somewhat more conductivity than 3% carbon fibers, the increase is not as significant. The use of overlay (compared with no overlay) normally increases the resistance more than an order of magnitude.

From the results it can be seen that fiber length has to be sufficiently great for the fibers to touch, i.e. provide an electrical path. When examined under the microscope, paper with 1/16 inch carbon fibers (as well as larger fibers in quantity less than 3%), it was seen that many carbon fibers did not touch. At longer fiber lengths, carbon fiber concentration was sufficiently low so that pleasing background color can be seen without coloring the decor paper grey or black. Once sufficient carbon fiber contact occurs (3% using fibers at least ⅛ inch long), increasing concentration helps to increase the conductivity, but not much. The presence of overlay increases the resistance to the $10^6$-$10^7$ range.

EXAMPLE 2

A second series of runs were carried out similar to the runs of Example 1, except that the decor paper contained 4% carbon fibers of ¼ inch length mixed with 1.3% carbon fibers of ⅛ inch length. The overlay paper contained 3% sodium acetate and 3% ETHOMEEN T/25. The core paper was the same as in Example 1, except that the phenolic resin was not modified by the addition of lithium chloride. After manufacture of the laminates, they were tested for surface and volume resistance. Results are shown below in Table 2:

TABLE 2

|  | Unmodified OL | Modified OL |
|---|---|---|
| Surface (ohms) | $1 \times 10^2$ | $7 \times 10^9$ | $3 \times 10^7$ |
| Volume (ohms) | $5 \times 10^3$ | $1.7 \times 10^9$ | $5 \times 10^6$ |

As can be seen, the modification of the melamine resin with ionic salt, i.e. sodium acetate, and with tertiary aliphatic amine, i.e. ETHOMEEN T/25, improved the conductivity.

EXAMPLE 3

Example 2 was repeated except that the decor sheet containing carbon fibers was saturated with melamine resin containing 3% sodium acetate and 3% ETHOMEEN T/25. Laminates were made with no overlay and with modified overlay as described in Example 2. The laminates were tested for surface resistance and volume resistance, and the results are set forth in Table 3 below:

TABLE 3

|  | No OL | Modified OL |
|---|---|---|
| Surface (ohms) | $1 \times 10^2$ | $5 \times 10^6$ |
| Volume (ohms) | $3.5 \times 10^3$ | $9 \times 10^5$ |

These results demonstrate that the addition of ionic salt and aliphatic tertiary amine to the conductive decor paper improved the electrical properties of the laminate by about one order of magnitude.

EXAMPLE 4

Two laminates were prepared according to Example 2. In one case, the core layers under the decor layer were all core paper A, i.e. filled with carbon particles, all 100 pounds per ream basis weight, saturated with phenolic resin, resin content 33-37%, volatile contents 6-8% and flow 1-3%. In the second case, the black paper A was interleaved with 156 pound per ream standard kraft core paper B saturated with phenolic resin containing 4% lithium chloride. Two 156 pound kraft sheets were substituted for three carbon black filled sheets. The final laminates were sanded so that both were the same thickness. The samples were then tested for dimensional stability according to NEMA LD 3-1980, and the results are given in Table 4 below:

TABLE 4

|  |  | Dimensional Stability | |
|---|---|---|---|
|  | Construction | Machine Direction | Cross Direction |
| Sample 1 | All Black Conductive | 0.22% | 0.74% |
| Sample 2 | Alternating Black & Modified Natural | 0.10% | 0.60% |

As can be seen, the sample with alternating black and modified natural core layers provide a greater dimensional stability.

The foregoing description of the specific embodiments will so fully reveal the general nature of the invention that others can, by applying current knowledge, readily modify and/or adapt such specific embodiments without departing from the generic concept, and therefore such adaptations and modifications should and are intended to be comprehended within the meaning and range of equivalents of the disclosed embodiments. It is to be understood that the phraseology or terminology employed herein is for purposes of description and not of limitation.

What is claimed is:

1. A high pressure, decorative, conductive laminate for use as flooring material, comprising
   a plurality of thermoset resin impregnated core sheets;
   a thermoset resin impregnated decor sheet overlying said core sheets, said decor sheet containing carbon fibers of length sufficient and in an amount sufficient to provide an electrically conductive path therethrough; and
   a thermoset resin impregnated abrasion-resistant overlay sheet, said thermoset resin of said overly sheet containing up to 6% by weight of an ionic salt and an amount sufficient of an humectant to improve the ability of the laminate to rapidly dissipate static electricity;
   said laminate having a volume resistance of at most $10^7$ ohms.

2. A decorative, conductive laminate flooring material according to claim 1 wherein said carbon fibers in said decor sheet are present in an amount of at least about 3% by weight and have a length greater than 1/16 inch.

3. A decorative, conductive laminate flooring material according to claim 2 wherein said carbon fibers are present in said decor sheet in an amount of 3–5% by weight.

4. A decorative, conductive laminate flooring material according to claim 3 wherein said thermoset resin for said decor sheet and said overlay comprises melamine-formaldehyde resin.

5. A decorative, conductive laminate flooring material according to claim 4 wherein said melamine-formaldehyde resin in said decor sheet contains 1–6% by weight, based on the resin solids, of an ionic salt.

6. A decorative, conductive laminate flooring material according to claim 5 wherein said melamine resin of said decor sheet contains 1–6% by weight, based on the resin solids, of a tertiary aliphatic amine.

7. A decorative, conductive laminate flooring material according to claim 1 wherein the thermoset resin of said decor sheet contains up to 6% by weight, based on the weight of the resin solids, of each of an ionic salt and a tertiary aliphatic amine.

8. A decorative, conductive laminate flooring material according to claim 1 having a volume resistance of $2.5 \times 10^4$ to about $10^7$ ohms.

9. A decorative, conductive laminate flooring material according to claim 1 wherein the resin of said core sheets is phenolic resin.

10. A decorative, conductive laminate flooring material according to claim 9 wherein said phenolic resin contains up to 6%, based on the phenolic resin solids, of an ionic salt.

11. A decorative, conductive laminate flooring material according to claim 1 wherein at least some of said core sheets are carbon impregnated.

12. A dimensionally stable decorative, conductive laminate flooring material according to claim 11 wherein at least one non-carbon-containing kraft paper core sheet is interleaved between a pair of said carbon-containing core sheets.

13. A dimensionally stable decorative, conductive laminate flooring material according to claim 12 wherein said core comprises alternating sheets of carbon-containing paper and non-carbon-containing paper.

14. A dimensionally stable decorative laminate flooring material according to claim 12 wherein the thermoset resin impregnating said at least one non-carbon-containing core sheet contains 1–6%, based on the resin solids, of an ionic salt.

15. A high pressure, decorative, conductive laminate for use as flooring material, comprising
    a plurality of melamine resin impregnated core layers;
    a melamine resin impregnated decor layer overlying said core layers, said decor layer containing carbon fibers of length sufficient greater than 1/16 inch and in an amount sufficient in the range of about 3–5% to provide an electrically conductive path therethrough; and
    a melamine resin impregnated abrasion-resistance overlay sheet, said melamine resin of said overlay sheet containing up to 6% by weight of in ionic salt and up to 6% by weight of an humectant based on the weight of resin solids;
    said laminate having a volume resistance of $2.5 \times 10^4$ to $10^7$ ohms.

16. A decorative, conductive laminate according to claim 1, wherein said humectant is an aliphatic tertiary amine, and said aliphatic tertiary amine is present in an amount of up to 6% by weight based on the weight of resin solids.

17. A decorative, conductive laminate according to claim 5, wherein said melamine resin of said decor sheet contains an amount of an humectant sufficient to improve the static electricity dissipating ability of said laminate.

18. A decorative, conductive laminate according to claim 1, wherein the thermoset resin of said decor sheet contains up to 6% by weight, based on the weight of the resin solids, of each of an ionic salt and an humectant.

* * * * *